(12) United States Patent
Macken et al.

(10) Patent No.: US 6,597,545 B2
(45) Date of Patent: Jul. 22, 2003

(54) SHIELD DESIGN FOR MAGNETORESISTIVE SENSOR

(75) Inventors: Declan Macken, Prior Lake, MN (US); Alan B. Johnston, Derry (IE); Harry S. Edelman, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/912,654

(22) Filed: May 24, 2001

(65) Prior Publication Data
US 2002/0048125 A1 Apr. 25, 2002

Related U.S. Application Data
(60) Provisional application No. 60/207,462, filed on May 25, 2000.

(51) Int. Cl.[7] .................................................. G11B 5/39
(52) U.S. Cl. ........................................................ 360/319
(58) Field of Search ................................. 360/319, 317, 360/126, 321

(56) References Cited

U.S. PATENT DOCUMENTS

| | | | |
|---|---|---|---|
| 4,488,194 A | 12/1984 | Michel | 360/113 |
| 4,803,580 A | 2/1989 | Mowry | 360/113 |
| 4,843,506 A | 6/1989 | Gill et al. | 360/113 |
| 4,881,143 A | 11/1989 | Bhattacharyya et al. | 360/113 |
| 5,168,409 A | 12/1992 | Koyama et al. | 360/113 |
| 5,255,141 A | 10/1993 | Valstyn et al. | 360/126 |
| 5,264,980 A | 11/1993 | Mowry et al. | 360/126 |
| 5,495,378 A | 2/1996 | Bonyhard et al. | 360/113 |
| 5,515,221 A * | 5/1996 | Gill et al. | 360/126 |
| 5,535,079 A | 7/1996 | Fukazawa et al. | 360/126 |
| 5,621,595 A | 4/1997 | Cohen | 360/126 |
| 5,633,771 A | 5/1997 | Yoda et al. | 360/121 |
| 5,838,521 A * | 11/1998 | Ravipati | 360/319 |
| 5,986,856 A | 11/1999 | Macken et al. | 360/113 |
| 5,995,339 A | 11/1999 | Koshikawa et al. | 360/113 |
| 6,018,443 A | 1/2000 | Watanabe et al. | 360/113 |
| 6,151,193 A * | 11/2000 | Terunuma et al. | 360/119 |
| 6,163,442 A * | 12/2000 | Gill et al. | 360/126 |
| 6,222,702 B1 | 4/2001 | Macken et al. | 360/128 |

FOREIGN PATENT DOCUMENTS

| | | | |
|---|---|---|---|
| JP | 59002222 | | 1/1984 |
| JP | 59-94224 | | 5/1984 |
| JP | 59-217220 | | 12/1984 |
| JP | 60-147915 A | * | 8/1985 |
| JP | 61-258323 A | * | 11/1986 |
| JP | 2-187912 A | * | 7/1990 |
| JP | 05266439 | | 10/1993 |
| JP | 6-267027 A | * | 9/1994 |
| JP | 6-267036 | | 9/1994 |
| JP | 6-325328 A | * | 11/1994 |
| JP | 7-169023 | * | 7/1995 |
| JP | 7-287817 A | * | 10/1995 |
| JP | 08-036717 A | * | 2/1996 |
| JP | 09-91625 | * | 4/1997 |
| JP | 09102109 | | 4/1997 |
| JP | 09-293219 A | * | 11/1997 |
| JP | 09-326104 A | * | 12/1997 |
| JP | 10-312513 A | * | 11/1998 |
| JP | 11-161920 A | * | 6/1999 |
| JP | 2000-48327 | * | 2/2000 |
| JP | 2000-137909 A | * | 5/2000 |

* cited by examiner

Primary Examiner—William Klimowicz
(74) Attorney, Agent, or Firm—Westman, Champlin & Kelly, P.A.

(57) ABSTRACT

A magnetic sensor includes a magnetoresistive sensor element and electrical contacts coupled to the magnetoresistive element configured to sense a response of the magnetoresistive element to a magnetic field. A magnetic shield is positioned adjacent the magnetoresistive element and configured to shield the magnetoresistive element from stray magnetic fields. The shield has a substantially stable magnetic domain pattern. A shield flux thief is positioned generally in a plane of the shield and spaced apart from the shield by a gap.

20 Claims, 8 Drawing Sheets

SHIELD DESIGN FOR MAGNETORESISTIVE SENSOR

CROSS-REFERENCE TO RELATED APPLICATION

The present application is based on and claims the benefit of U.S. provisional patent application Ser. No. 60/207,462, filed May 25, 2000, the content of which is hereby incorporated by reference in its entirety.

FIELD OF THE INVENTION

The present invention relates generally to magnetoresistive sensors. More specifically, the present invention relates to magnetic shields used in magnetoresistive sensors.

BACKGROUND OF THE INVENTION

The present invention relates to magnetoresistive (MR) sensors. More specifically, the present invention relates to a magnetoresistive sensor having improved stability during operation.

Magnetic storage systems are used to store information in a magnetic format for subsequent retrieval. Various technologies are available for reading back the stored information. One newer technology is the use of a magnetoresistive sensor for such read back.

Magnetoresistive sensors are responsive to a change in resistivity caused by the presence of magnetic fields and are increasingly being employed as read back elements in the heads of magnetic disc drives. They are particularly advantageous because the change in resistivity is independent of disc speed and depends only on the magnetic flux. Further, the sensor output is easily scaled by adjusting the sense current. Various types of magnetoresistive sensors include AMR, GMR and tunnel junction sensors. The sensor is mounted in the head parallel to the plane of the disc and to the direction of disc rotation. Magnetic flux from the disc surface causes a change in electrical resistivity. A sense current is passed through the sensor active layer and the magnetic flux can be detected by measuring the change in voltage across the element as a result of the changing resistivity.

One problem encountered with magnetoresistive sensors is Barkhausen noise which is caused by an irreversible motion of magnetic domains in the presence of an applied field, i.e., coherent rotation of the magnetization vector is non uniform and suppressed, and depends upon domain wall behavior. Barkhausen noise generated in the magnetoresistive element may be eliminated by creating a single magnetic domain in the active region of the magnetoresistive sensor. Reduction of such Barkhausen noise generated in the magnetoresistive element is described in U.S. Pat. No. 4,803,480 entitled DOUBLE-GAP MAGNETORESISTIVE HEAD HAVING AN ELONGATED CENTRAL WRITE/SHIELD POLE COMPLETELY SHIELDING THE MAGNETORESISTIVE SENSOR STRIP IN THE READ GAP which was issued Feb. 7, 1989 to Mowry.

The present invention provides a solution to these and other problems and offers other advantages over the prior art.

SUMMARY OF THE INVENTION

The present invention relates to magnetoresistive sensors that have a magnetic shield which addresses the above mentioned problems.

In accordance with one embodiment of the invention, a magnetoresistive sensor includes a magnetic shield and a shield "flux thief." The sensor can be used in a magnetic storage device and includes a magnetoresistive sensor element, electrical contacts coupled to the magnetoresistive element and a transducer in a magnetic storage device, comprising a magnetoresistive sensor element and electrical contacts coupled to the magnetoresistive element configured to sense a response of the magnetoresistive element to a magnetic field. A magnetic shield adjacent the magnetoresistive element is configured to shield the magnetoresistive element from stray magnetic fields. The shield has a substantially stable magnetic domain pattern. A shield flux thief is spaced apart from the shield and reduces a demagnetization field in the shield during fabrication of the magnetoresistive sensor element.

DETAILED DESCRIPTION OF ILLUSTRATIVE EMBODIMENTS

In magnetoresistive transducers, it is desirable to have a shield design which constrains the magnetic domain walls in the shield to reduce interaction between the shield and the sensor. If the domains are unstable in the shield, changes in the domain patterns can cause noise in the magnetoresistive sensor. Solutions to this problem are discussed in U.S. Pat. No. 5,986,856, issued Nov. 16, 1999, entitled MAGNETORESISTIVE SENSOR WITH IMPROVED STABILTY and U.S. Pat. No. 6,222,702, issued Apr. 24, 2001, entitled MAGNETIC READ ELEMENT SHIELD HAVING DIMENSIONS THAT MINIMIZE DOMAIN WALL MOVEMENTS, assigned to the present assignee and incorporated herein by reference in their entirety. However, if the shield is relatively small, the shield generates a demagnetization field during deposition and process of the magnetoresistive sensor element. The demagnetization from the shield is significant and is localized in the region of the sensor during deposition and magnetic anneal procedures used in fabricating the sensor. In one aspect, the present invention provides a technique to retain the desired shield dimensions and configuration while reducing the demagnetization field from the shield during sensor deposition. This is achieved by forming a "flux thief" which surrounds the shield and acts to spread the demagnetization field and thereby reduce the local strength of the demagnetization field without causing instability in the domains of the shield. The flux thief forms complimentary magnetic poles which couple to magnetic poles of the shield thereby providing localized end points for the magnetic flux due to the demagnetization field on the shield.

Figure 1:
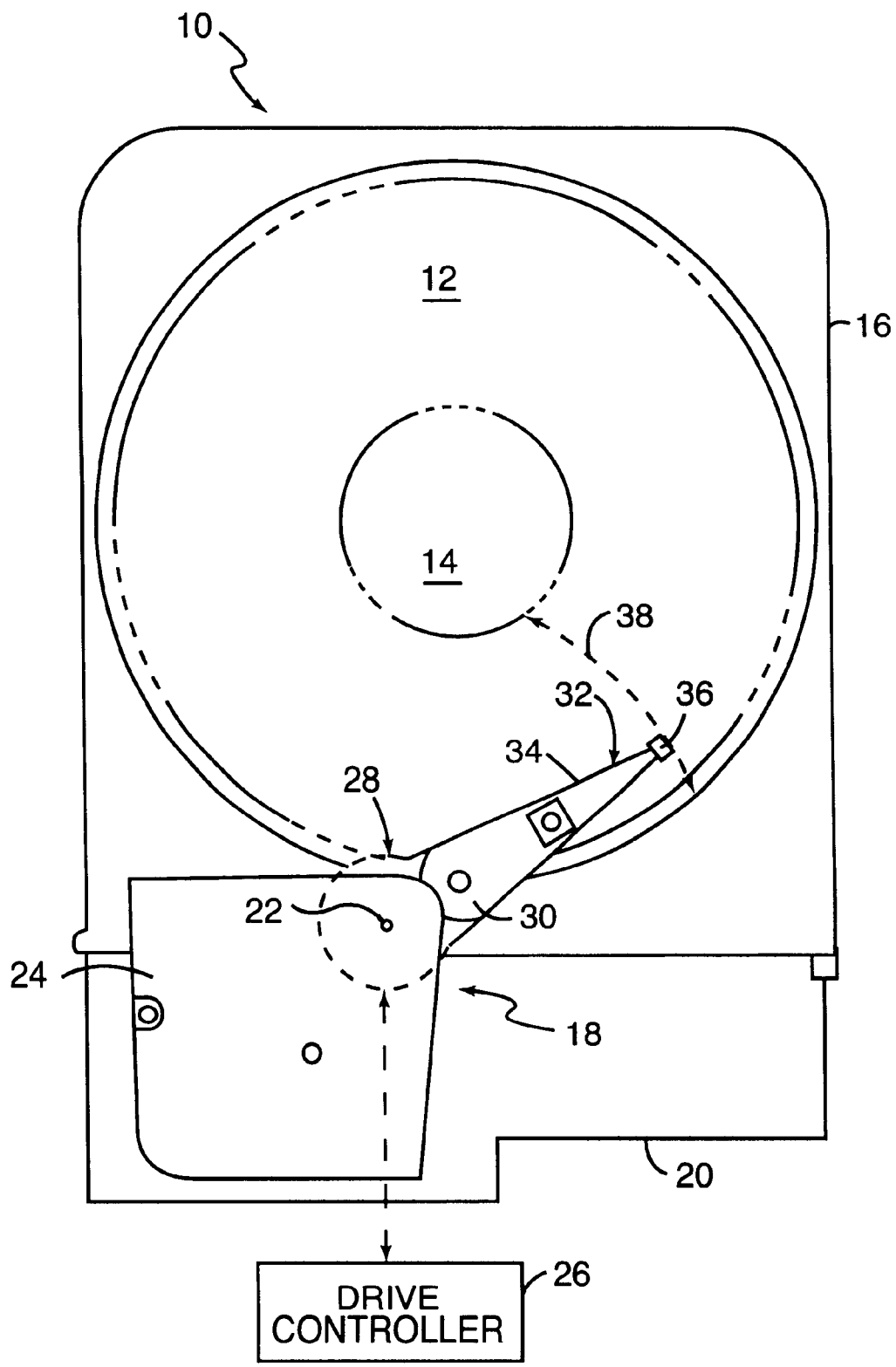
FIG. 1 is a simplified diagram of a disc storage system.

FIG. 1 is a top view of a disc drive 10 including a magnetoresistive sensor in accordance with the present invention. Disc drive 10 includes a magnetic disc 12 mounted for rotational movement about and axis defined by spindle 14 within housing 16. Disc drive 10 also includes an actuator 18 mounted to a base plate 20 of housing 16 and pivotally moveable relative to disc 12 about axis 22. A cover 24 covers a portion of actuator 18. Drive controller 26 is coupled to actuator 18. In the preferred embodiment, drive controller 26 is either mountable within disc drive 10, or is located outside of disc drive 10 with suitable connection to actuator 18. Actuator 18, includes an actuator arm assembly 28, a rigid support member 30, and a head gimbal assembly 32. Head gimbal assembly 32 includes a load beam or flexure arm 34 coupled to rigid member 30, and a hydrodynamic air bearing (a slider) 36 coupled by a gimbal (not shown) to load beam 34. Slider 36 supports a magnetoresistive transducer for reading information from disc 12 and encoding information on disc 12.

During operation, drive controller 26 receives position information indicating a portion of disc 12 to be accessed. Drive controller 26 receives the position information from an operator, from a host computer, or from another suitable controller. Based on the position information, drive controller 26 provides a position signal to actuator 18. The position signal causes actuator 18 to pivot about axis 22. This, in turn, causes actuator 18 to pivot about axis 22. This, in turn, causes slider 36 (and consequently the transducer mounted on slider 36) to move radially over the surface of disc 12 in a generally arcuaic path indicated by arrow 38. Drive controller 26 and actuator 18 operate in a known closed loop, negative feedback manner so that the transducer carried by slider 36 is positioned over the desired portion of disc 12. Once the transducer is appropriately positioned, drive controller 26 then executes a desired read or write operation.

Figure 2:
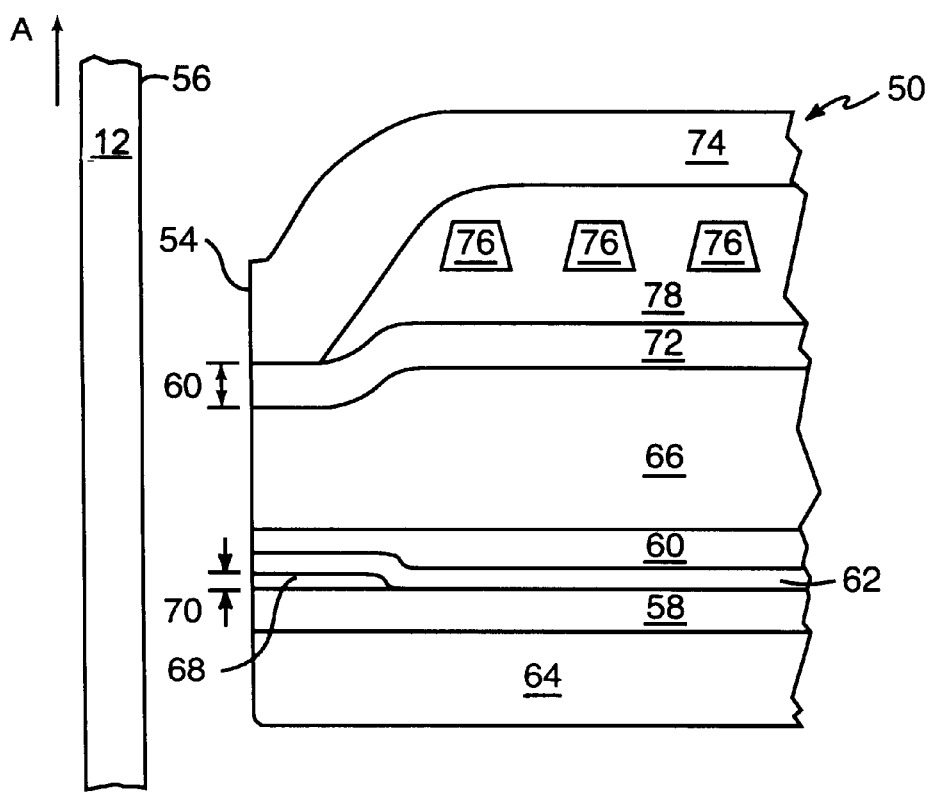
FIG. 2 is a cross-sectional view of a magnetic read/write head and magnetic disc taken along the plane normal to the air bearing surface of the read/write head.

FIG. 2 is a cross-sectional view of magnetic read/write head 50 and magnetic disc 12 taken along a plane normal to air bearing surface 54 of read/write head 50. Head 50 is carried on or part of slider 36 shown in FIG. 1. FIG. 1 illustrates magnetic read/write head 50 and its placement relative to magnetic disc 12. Air bearing surface 54 of magnetic read/write head 50 faces disc surface 56 of magnetic disc 12. Magnetic disc 12 travels or rotates in a direction relative to magnetic read/write head 10 as indicated by arrow A. The spacing between air bearing surface 54 and disc surface 56 is preferably minimize while avoiding contact between magnetic read head 50 and magnetic disc 12.

A reader portion of read/write head 50 includes bottom gap layer 58, top gap layer 60, metal contact layer 62, bottom shield 64, top shield 66, and read element 68. Read gap 70 is defined on air bearing surface 54 between bottom gap layer 58 and metal contact layer 62. Metal contact layer 62 is positioned between bottom gap layer 58 and top gap layer 60. Read element 68 is positioned between terminating ends of bottom gap layer 58 and metal contact layer 62.

A writer portion of magnetic read/write head 50 includes top shield 66, write gap layer 72, top pole 74, conductive coil 76, and polymer layer 78. Write gap 80 is defined on air bearing surface 54 by write gap layer 72 between terminating ends of top pole 74 and top shield 66. In addition to acting as a shield, top shield 66 also function as a shared pole for use in conjunction with top pole 74. Electrically conductive coils 76 are provided to generate magnetic fields across write gap 80 and are positioned in polymer layer 78 between top pole 74 and write gap layer 72. While FIG. 2 shows a single layer of conductive coils 76, it is understood in the art that several layers of conductive coils may be used separated by several polymer layers. Although a read/write head is shown, the invention is applicable to magnetoresistive sensors that do not include write elements.

Figure 3:
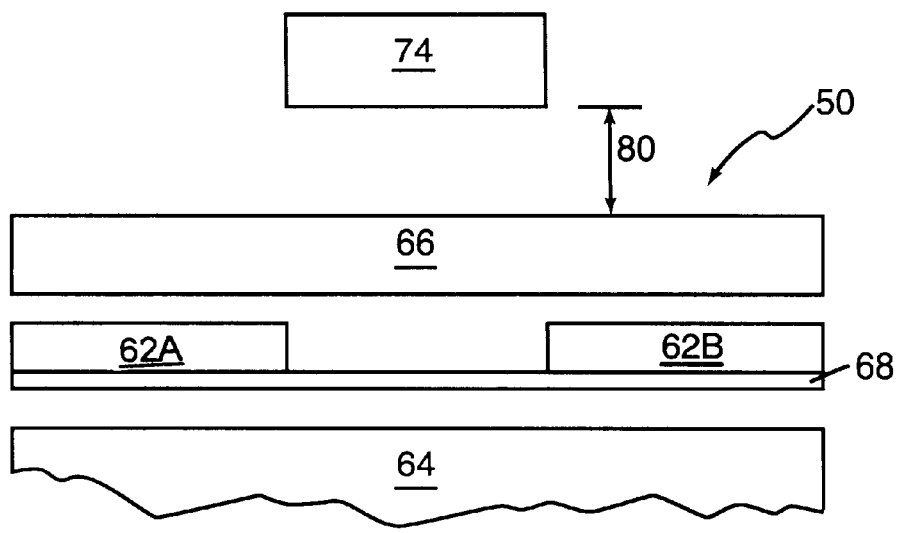
FIG. 3 is a layered diagram of the magnetic read/write head as viewed from the air bearing surface.

FIG. 3 is a layered diagram of magnetic read/write head 50. FIG. 3 illustrates the location of a plurality of magnetically significant elements of magnetic read/write head 50 as they appear along air bearing surface 54 of magnetic read/write head 50 shown in FIG. 2. In FIG. 3, all spacing and insulating layers are omitted for clarity. Bottom shield 64 and top shield 66 are spaced to provide for a location of read element 68. Read element 68 has two passive regions defined as the portions of read element 68 positioned adjacent to metal contacts 62A and 62B. An active region of read element 68 is defined as the portion of read element 68 located between the two passive regions of read element 68. The active region of read element 68 defines a read sensor width.

Read element 68 is preferably a magnetoresistive element or a giant magnetoresistive stack. A magnetoresistive element is generally formed of a ferromagnetic material whose resistance fluctuates in response to an external magnetic field, preferably from a magnetic medium or disc. By providing a sense current through the magnetoresistive element, a change in resistance of the magnetoresistive element can be measured and used by external circuitry to decipher the information stored on the magnetic medium or disc. A giant magnetoresistive stack operates similarly, but allows for a more pronounced magnetoresistive effect. A giant magnetoresistive stack is generally formed of three layers: a ferromagnetic free layer, a ferromagnetic pin layer, and a non-magnetic spacer layer positioned between the free layer and the pin layer. A pinned magnetization of the pin layer is held constant while a free magnetization of the free layer is free to rotate in response to an external magnetic field, i.e. a transition from a magnetic disc. A resistivity of the giant magnetoresistive stack varies as a function of an angle between the direction of the free magnetization and the pin magnetization.

Figure 4:
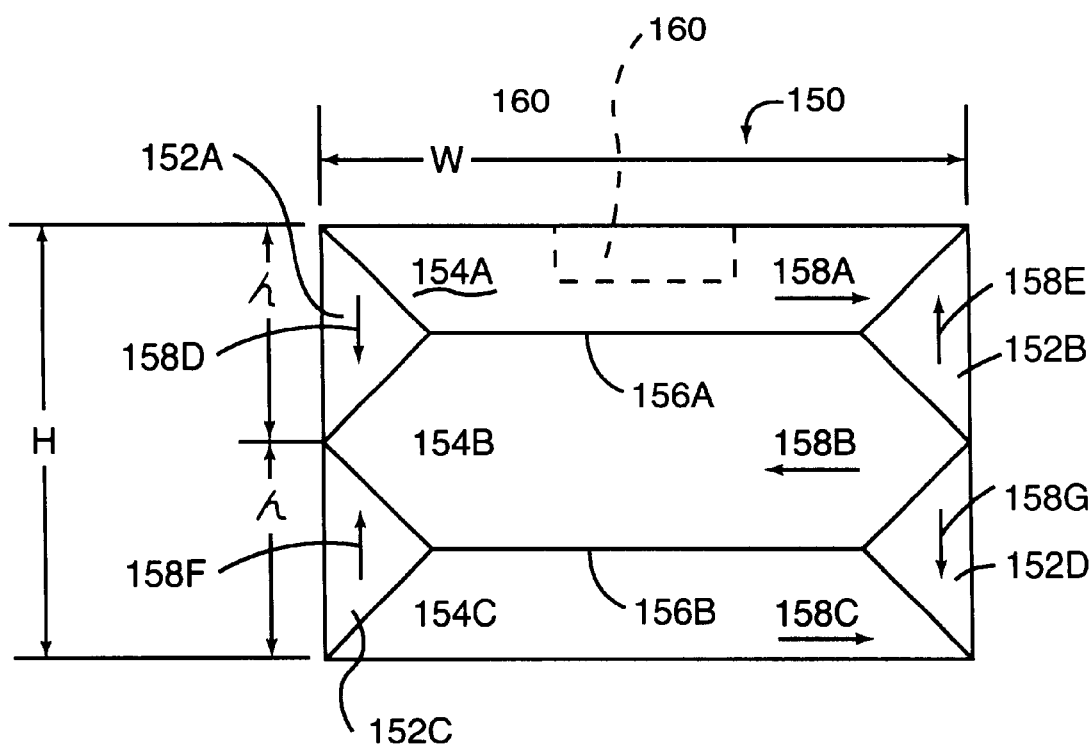
FIG. 4 is a plan view of a small bottom shield having a substantially stable magnetic domain pattern.

FIG. 4 is a plan view of a shield 150 under no external magnetic fields. In one embodiment, shield 150 is the bottom shield 64 shown in FIGS. 2 and 3. Shield 150 includes triangular shaped closure magnetic domains 152A, 152B, 152C, and 152D, magnetic domains 154A, 154B, 154C, and magnetic domain walls 156A and 156B. Magnetizations 158A–158G represent the magnetization on each magnetic domain. Shield 150 has been designed such that the width W to height H ratio provides an ideal magnetic domain structure. The width to height ratio is dependent upon various material characteristics including anisotropy, magnetic moment, and film thickness. For any material the ideal height should equal the height of one or two domain periods for any feature width. This can be determined by calculation or by empirical study of domains on rectangular features of varying width and height. This width to height ratio permits exactly two triangular shaped closure magnetic domains to be positioned on each side of shield 150. Thus triangular shaped closure magnetic domains 152A–152D each equal an equilibrium domain, the equilibrium domain being an average width of a magnetic domain in a demagnetized sample shield that has a total magnetic moment equal to zero.

With no magnetic field being exerted on shield 150, triangular shaped closure magnetic domains 152A–152D each have a base height h equal to one-half of shield height H. In addition, magnetic domain 154A has a height equal to that of magnetic domain 154C. Likewise, due to the specific design, the height of magnetic domain 154B is equal to twice that of the height of either magnetic domain 154A or magnetic domain 154C. As shown in FIG. 4, shield 150 is sized with a width larger than the width of read element 160. This design feature insures that no domain walls pass through read element 160. The present invention is applicable to other shield designs and domain configurations and is not limited to those shown specifically herein.

If the configuration of the shield 150 shown in FIG. 4 is employed, the shield must be patterned prior to deposition of sensor 160. The demagnetization field from the shield is significant and, due to its small size, localized in the region of the sensor during deposition of the sensor and magnetic anneal procedures which are used when fabricating the sensor 160. The demagnetization shield will oppose the applied field which is used to align various layers in sensor 160.

Figure 5:
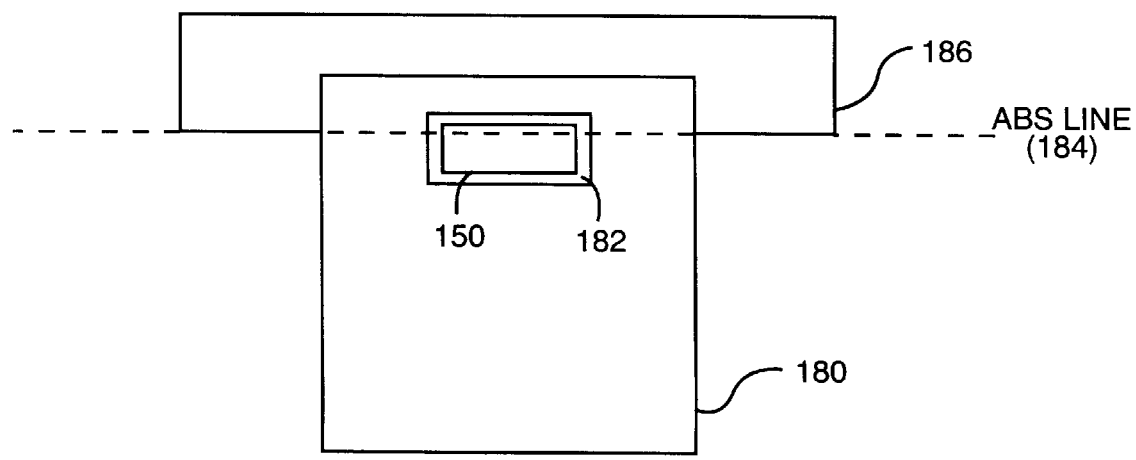
FIG. 5 is a plan view of a magnetic shield and a shield flux thief in accordance with one example embodiment of the present invention.

In order to retain the desired shield dimensions while reducing the demagnetization field during sensor deposition, a flux thief 180 as shown in FIG. 5 can be formed. The flux thief 180 surrounds shield 150 and is separated from shield by a gap 182. The gap 182 can be any appropriate dimension based upon materials, dimensions and field strengths. In one example, gap 182 is between about 5 and about 40 $\mu$m. In another example, gap 182 is less than about 5 $\mu$m. In various aspects, the gap may be a variable distance and/or there may be regions where shield 150 contacts thief 180. The shape of shield 150 can be any desired shape and is not limited to the shapes illustrated herein. Similarly, the flux thief can be any desired shape and material and is not limited to those specifically illustrated herein.

In one example embodiment, the flux thief 180 is fabricated from the same material as shield 150. In such an embodiment, shield 150 and thief 180 can be electroplated through a photoresist mask or can be patterned after deposition. However, any deposition and/or fabrication technique can be used. The material of the shield which lies outside of the active region of the sensor (not shown in FIG. 5) can be patterned to dimensions to allow saturation of the composition shield. During fabrication, a lapping process is used to remove material 186 until to air bearing surface (ABS) line 184 is reached.

Figure 6:
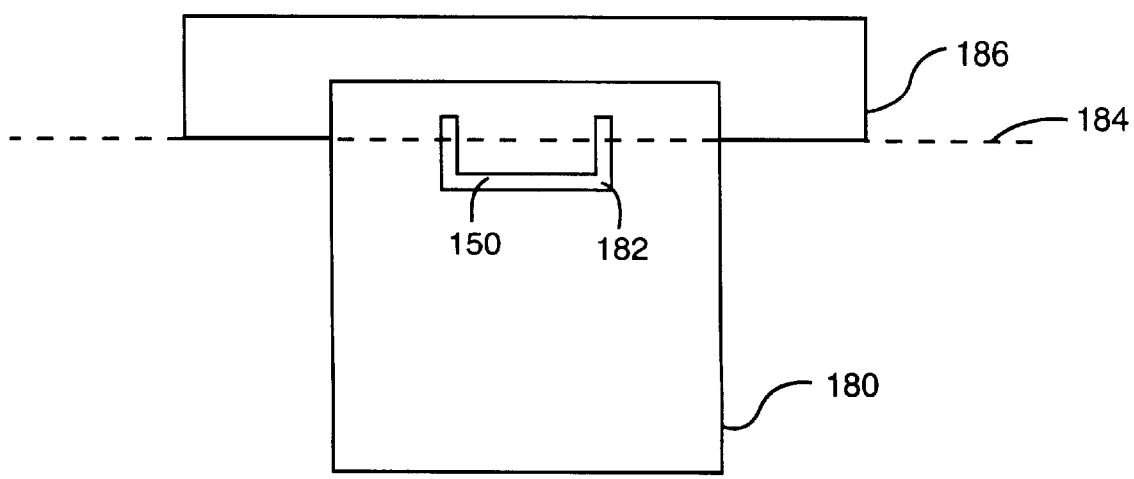
FIG. 6 is a plan view of another example embodiment of a shield flux thief.

FIG. 6 shows another example embodiment of flux thief 180 in which the gap 182 does not extend completely around shield 150. In the embodiment of FIG. 6, the shield 150 is attached to the flux thief 180 along a region which is removed during the lapping process used to form air bearing surface line 184. This configuration further reduces the demagnetization field for those layers deposited or annealed in a field which is perpendicular to the air bearing surface. Shield 150 can be overcoated and planarized using a material which is effective as a thermal expansion joint. The overcoat can fill the gap 182 and buffer any thermal expansion of the shield 150 at operating temperature. The overcoat can have a thermal expansion coefficient which is in the opposite direction of the shield to thereby compensate for shield and flux thief expansion. The overcoat can also be used in other embodiments.

Figure 7:
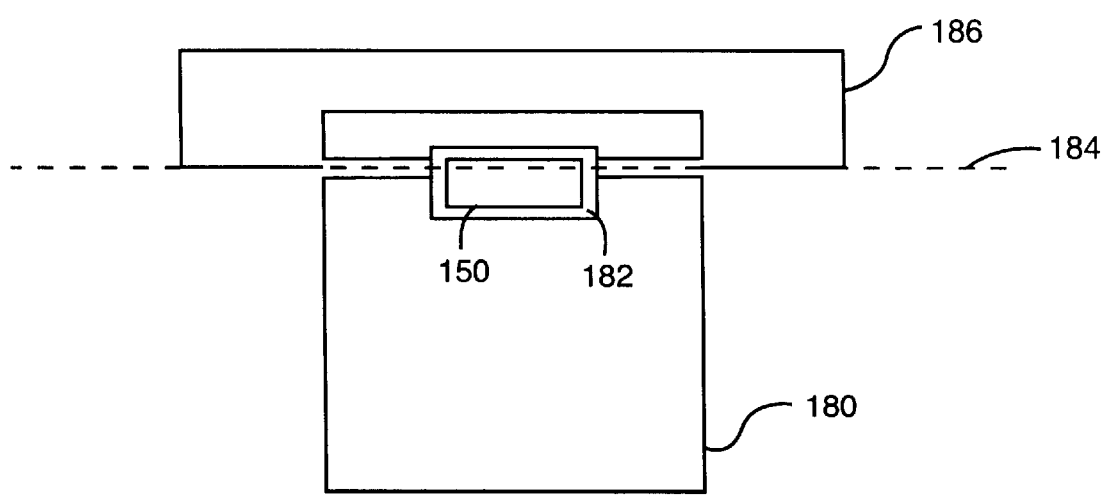
FIG. 7 is a plan view of another example embodiment of a shield flux thief.

FIG. 7 shows another example embodiment in which the flux thief 180 is recessed from the air bearing surface line 184. In this embodiment, the flux thief 180 is not exposed to the machining process. This can be beneficial as it reduces the likelihood that components are shorted together at the air bearing surface and allows the stripe width of the sensor to be more accurately measured during the lapping process.

Figure 8:
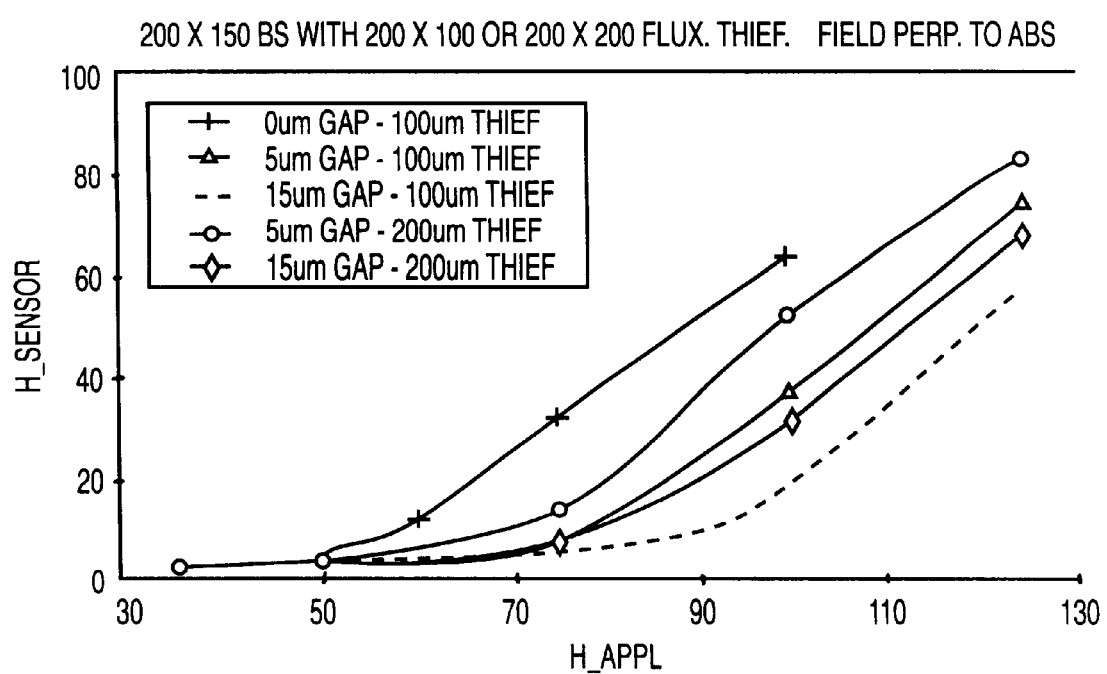
FIG. 8 is graph of applied magnetic field versus magnetic field in a sensor for a number of different flux thief configurations.

FIG. 8 is a graph of the magnetic field and the sensor versus the applied magnetic field for a number of different flux thief configurations. The effectiveness of the flux thief is dependent upon the distance from the shield and the length of the flux thief in the direction of the applied field. As illustrated in FIG. 8, where processing parameters allow, it is preferable to have a distance between the thief 180 and the shield 150 be less than 5 $\mu$m and to have the thief at least 200 $\mu$m long in the direction of the applied field.

Figure 9:
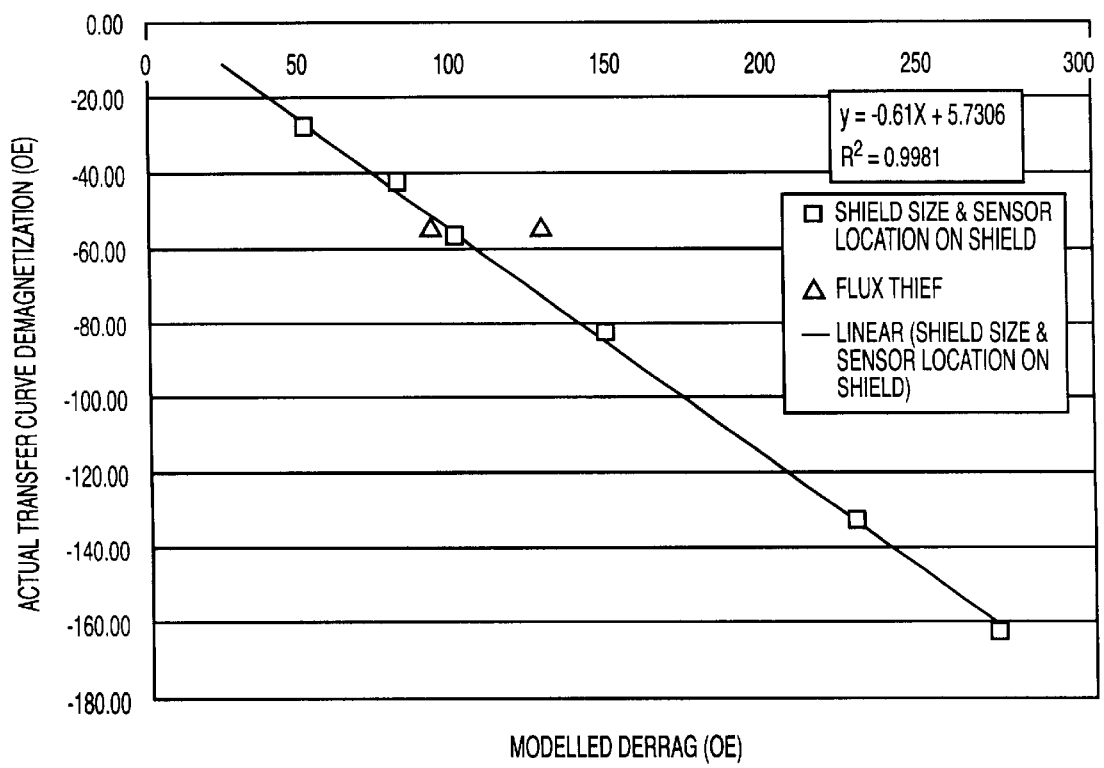
FIG. 9 is a graph of actual demagnetization field versus modeled demagnetization field.

FIG. 9 is a graph of the actual transfer curve demagnetization versus modeled demagnetization in oersteds. FIG. 9 illustrates the modeled demagnetization field versus the measured demagnetization field of one embodiment of the invention compared to stand alone single shields. FIG. 9 illustrates the influence of the shield flux thief in modifying the demagnetization field. In one test, a hard access measurement shows a 10% reduction in the demagnetization field present at the sensor.

The present invention provides the benefits of a small shield overlying or adjacent to a magnetoresistive sensor, while also providing the benefits of reduction of the demagnetization field associated with a large shield. The small shield preferably has a configuration to provide stable magnetic domains. The large shield or "thief" 180 spreads the demagnetization field over a larger area and reduces the demagnetization field seen by the magnetoresistive sensor.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the magnetoresistive sensor while maintaining substantially the same functionality without departing from the scope and spirit of the present invention. In addition, although the preferred embodiment described herein is directed to a magnetoresistive sensor for a disc system, it will be appreciated by those skilled in the art that the teachings of the present invention can be applied to other systems, which sense magnetic fields without departing from the scope and spirit of the present invention. The flux thief can be of any appropriate material such as a soft magnetic material, for example, permalloy.

What is claimed is:

1. A magnetic sensor in a magnetic storage device, comprising:
   a magnetoresistive sensor element;
   electrical contacts coupled to the magnetoresistive element configured to sense a response of the magnetoresistive element to a magnetic field;
   a magnetic shield having a major surface defining a manor plane facing the magnetoresistive element, the major surface extending to a shield edge that is generally normal to the major plane, the magnetic shield being configured to shield the magnetoresistive element from stray magnetic fields, and the shield having a substantially stable magnetic domain pattern; and a shield flux thief generally in the major plane of the magnetic shield and outside the shield edge, the shield flux thief having an inner flux thief edge that faces and is spaced apart from the shield edge by a gap, the flux thief and the shield configured to reduce a demagnetization field produced in the shield that couples to the magnetoresistive sensor element.

2. The magnetic sensor of claim 1 wherein the magnetic shield has a geometry to provide a substantially stable magnetic domain pattern.

3. The magnetic sensor of claim 1 wherein the shield flux thief is configured to reduce a demagnetization field in the magnetoresistive sensor element.

4. The magnetic sensor of claim 1 including an air bearing surface and wherein the shield flux thief is recessed from the air bearing surface.

5. The magnetic sensor of claim 1 wherein the gap between the shield flux thief and the magnetic shield is between 5 and 40 $\mu$m.

6. The magnetic sensor of claim 1 wherein the gap between the shield flux thief and the magnetic shield is less than about 5 $\mu$m.

7. The magnetic sensor of claim 1 including an air bearing surface and wherein the magnetic shield has a least one side which is substantially flush with the air bearing surface.

8. The magnetic sensor of claim 7 wherein the shield flux thief has first and second sides, positioned on opposite sides of the magnetic shield, which are substantially flush with the air bearing surface.

9. The magnetic sensor of claim 1 including an inductive write element configured to write magnetically encoded information.

10. The magnetic sensor of claim 1 wherein the magnetic shield and the shield flux thief are deposited in the same step.

11. A disc storage system including a magnetic sensor in accordance with claim 1.

12. A method of fabricating a magnetic sensor for use in a magnetic storage device, comprising:
    depositing a layer of magnetic material on a substrate, the layer of magnetic material having a major surface defining a major plane;
    forming a gap in the magnetic material to thereby form a magnetic shield having a shield edge that is generally normal to the major plane and a shield flux thief having an inner flux thief edge that is generally normal to the major plane and outside the shield edge; and
    depositing a magnetoresistive sensor facing the major plane proximate the magnetic shield;
    wherein the flux thief is configured to reduce a demagnetization field coupled to the magnetoresistive sensor during deposition of the magnetoresistive sensor.

13. The method of claim 12 wherein the magnetic shield is configured to have a substantially stable magnetic domain pattern.

14. The method of claim 12 including lapping the sensor to form an air bearing surface and wherein the magnetic shield and the magnetic flux thief have edges which are substantially flush with the air bearing surface.

15. The method of claim 12 wherein the gap is less than about 40 $\mu$m.

16. A magnetic sensor made in accordance with the method of claim 12.

17. A disc storage system including a magnetic sensor made in accordance with the method of claim 12.

18. A magnetic sensor in a magnetic storage system, comprising:
    magnetoresistive sensor means for sensing magnetically encoded information;
    magnetic shield means for shielding the magnetoresistive sensor means from magnetic fields, the magnetic shield means having a major surface facing the magnetoresistive sensor means and defining a major plane, and the magnetic shield means having shield edges that are generally normal to the major surface; and
    shield flux thief means for reducing a demagnetization field coupled from the magnetic shield means to the magnetoresistive sensor means, the shield flux thief means laying in the major plane and having flux thief edges outside of and facing the shield edges of the magnetic shield means.

19. The magnetic sensor of claim 18 wherein the shield flux thief means comprises magnetic material spaced apart from the magnetic shield means by a gap.

20. The magnetic sensor of claim 18 wherein the magnetic shield means has a geometry to provide a substantially stable magnetic domain pattern.

* * * * *

UNITED STATES PATENT AND TRADEMARK OFFICE
CERTIFICATE OF CORRECTION

PATENT NO.    : 6,597,545 B2
DATED         : July 22, 2003
INVENTOR(S)   : Declan Macken et al.

It is certified that error appears in the above-identified patent and that said Letters Patent is hereby corrected as shown below:

Column 6,
Line 61, delete "manor" and insert -- major --.

Signed and Sealed this

Twentieth Day of April, 2004

JON W. DUDAS
*Acting Director of the United States Patent and Trademark Office*